Oct. 27, 1953

G. V. HELMS 2,656,942

RETRACTABLE GEAR FOR PORTABLE FREIGHT UNITS

Filed Oct. 2, 1950

GEORGE V. HELMS,
INVENTOR.

BY Hazard & Miller

ATTORNEYS.

Oct. 27, 1953    G. V. HELMS    2,656,942
RETRACTABLE GEAR FOR PORTABLE FREIGHT UNITS
Filed Oct. 2, 1950    3 Sheets-Sheet 2

GEORGE V. HELMS,
INVENTOR.

BY *Hazard & Miller*

ATTORNEYS.

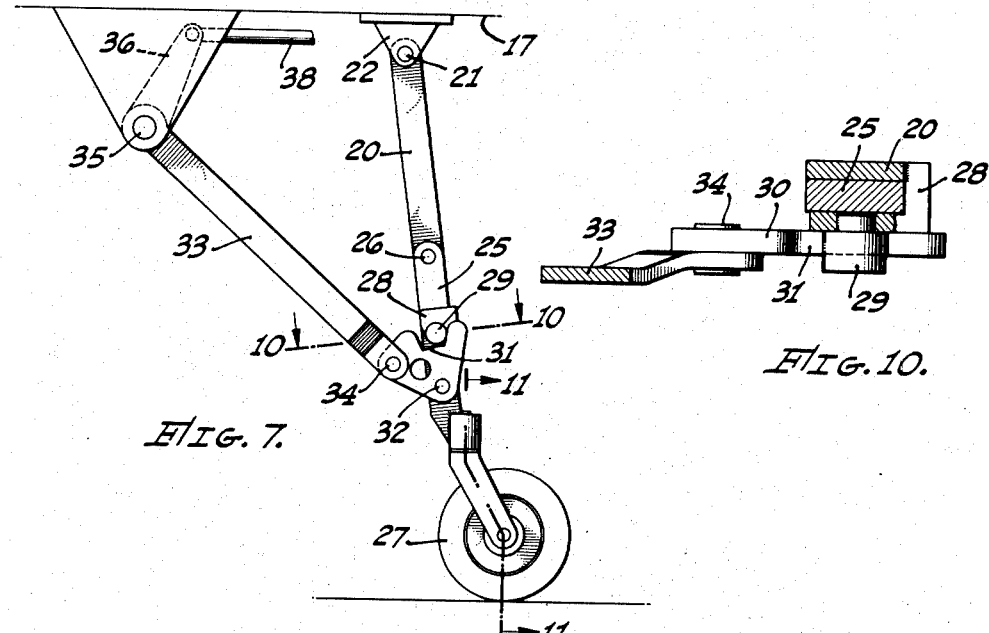
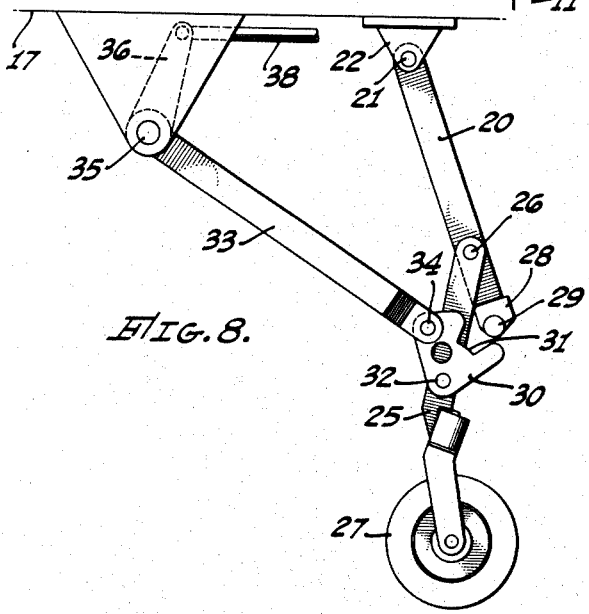
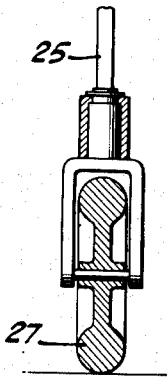
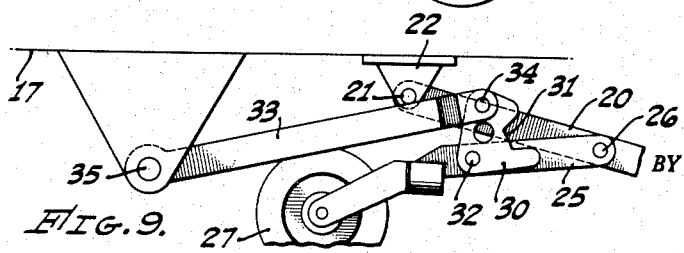

Patented Oct. 27, 1953

2,656,942

UNITED STATES PATENT OFFICE 2,656,942

RETRACTABLE GEAR FOR PORTABLE FREIGHT UNITS

George V. Helms, Los Angeles, Calif.

Application October 2, 1950, Serial No. 187,997

5 Claims. (Cl. 214—515)

This invention relates to retractable gear for portable freight units.

It is desirable in hauling freight by truck to have the truck body in which the freight may be loaded detachable from and removable from the truck chassis and to provide means for supporting the body at loading dock height. With such an arrangement a loaded body may be transported by the truck chassis to a loading dock, removed from the truck chassis and supported at loading dock height. The truck chassis may then be used to pick up a loaded body and transport it elsewhere while the removed body is left adjacent the loading dock for unloading purposes. Subsequently the removed body may be re-loaded and picked up by the mentioned chassis or another truck chassis and transported. With this arrangement a removed truck body may serve as a portable but temporary warehouse in which its freight may be housed while awaiting an opportunity to be unloaded and, conversely, the body may be conveniently loaded at any time without requiring that the truck chassis be detained during the loading period.

In constructions of this character it is highly desirable that the body be supported on the frame of the truck chassis without being disposed at an abnormal elevation thereabove and, to this end, an object of the present invention is to provide a retractable gear for the body which can be collapsed in a position against the underside of the body which will not require or involve the supporting of the body too high above the frame of the truck chassis. At the same time the retractable gear when extended should be of sufficient length so that the body will be supported at loading dock height and at a height so that the truck chassis may be backed therebeneath or moved forwardly therefrom.

More specifically, an object of the present invention is to provide an improved retractable gear for truck bodies which is mechanically strong and which can be automatically operated to extend or retract the gear. In the preferred form of construction a pair of collapsible and extendable legs are provided at the rear of the truck body and a similar pair of legs are mounted on the truck body adjacent the forward end thereof. Each pair is operable independently of the other and preferably from the rear of the truck body. The supporting legs are disposed outwardly of or in straddling relationship to the frame of the truck chassis so that the rear legs may be extended behind the rear wheels of the truck chassis. The body may then be partially withdrawn from the truck chassis and the forward legs may then be extended while in a position behind the rear wheels of the truck chassis. When all legs have been thus extended the body can be removed from the truck chassis and can be left in self-supporting condition at loading dock height.

With the foregoing and other objects in view, which will be made manifest in the following detailed description and specifically pointed out in the appended claims, reference is had to the accompanying drawings for an illustrative embodiment of the invention, wherein Figure 1 is a view in side elevation of a truck chassis and a truck body embodying the present invention wholly disposed thereon, the collapsible legs for the truck body being shown in collapsed condition;

Fig. 7 is a view on an enlarged scale illustrating one of the rear legs in fully extended position;

Fig. 8 is a view similar to Fig. 7 but illustrating the leg as having been started on its collapsing movement;

Fig. 9 is a view similar to Figs. 7 and 8 but illustrating the retractable gear as having been completely collapsed;

Fig. 10 is a sectional view taken substantially upon the line 10—10 upon Fig. 7; and Fig. 11 is a sectional view taken substantially upon the line 11—11 upon Fig. 7.

Figure 1:
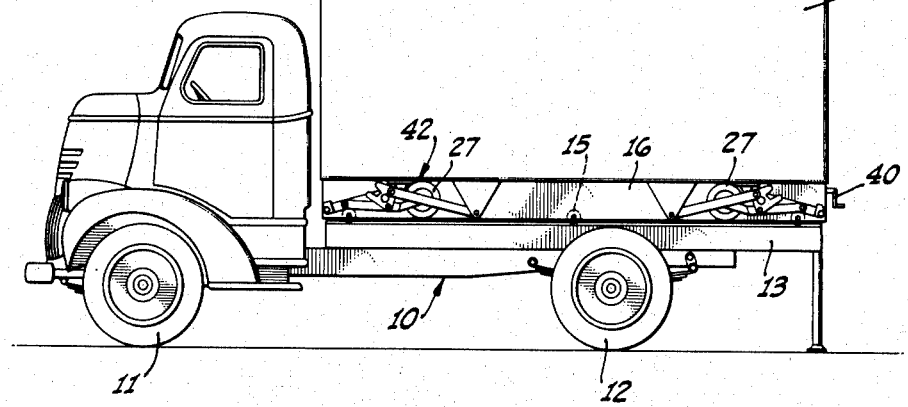

Referring to the accompanying drawings wherein similar reference characters designate similar parts throughout, 10 indicates generally a truck chassis having front wheels 11 and rear wheels 12 supporting a frame 13. On top of the frame 13 I provide longitudinally extending rails 14 which may be in the form of shallow channel irons which receive supporting rollers 15 that are rotatably mounted on supporting structures 16 that are secured to the underside of the truck body 17. The rollers 15 serve to support the body 17 on the frame 13 of the truck chassis while the body is being transported. The rollers, however, enable the truck body either while loaded or unloaded to be rolled off of the frame of the truck chassis by rolling on the rails 14.

Adjacent the rear of the truck body there is a pair of extendable legs or retractable gears. Each leg or gear consists of an upper leg member 20 rigidly secured to the outer end of a rocker shaft 21, the ends of which are rotatably disposed in journals 22 and 23. A brace 24 connects the inner end of each rocker shaft 21 with the lower end of its leg section 20 so that the upper leg sections will be adequately braced laterally. Lower leg sections 25 are pivoted at 26 to the upper leg sections 20 intermediate the ends of the upper leg sections. These lower leg sections have caster wheels 27 mounted thereon designed to engage the road surface when the gear is extended. The extreme lower ends of the upper leg sections 20 have angles 28 welded or otherwise secured thereto and which cooperate with the upper leg sections to form U-shaped sockets designed to receive the lower leg sections 25 to limit swinging movement of the lower leg sections relative to the upper leg sections in one direction and preferably in a position wherein the lower leg sections are in substantial alignment with the upper leg sections as illustrated in Fig. 7.

Figure 4:
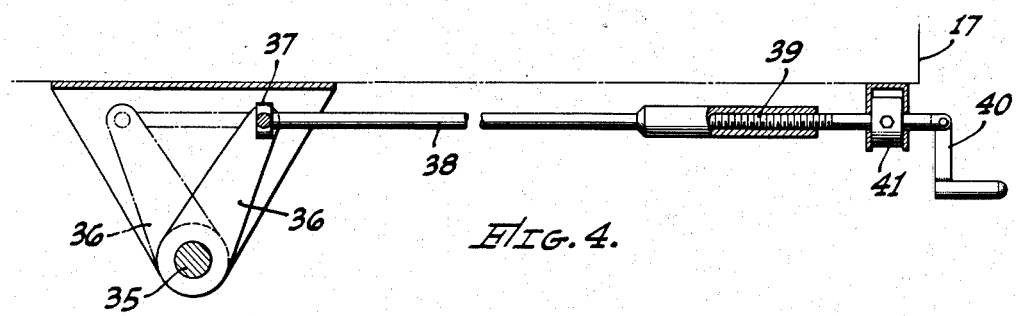
Fig. 4 is a sectional view taken substantially upon the line 4—4 upon Fig. 3.
Figure 5:
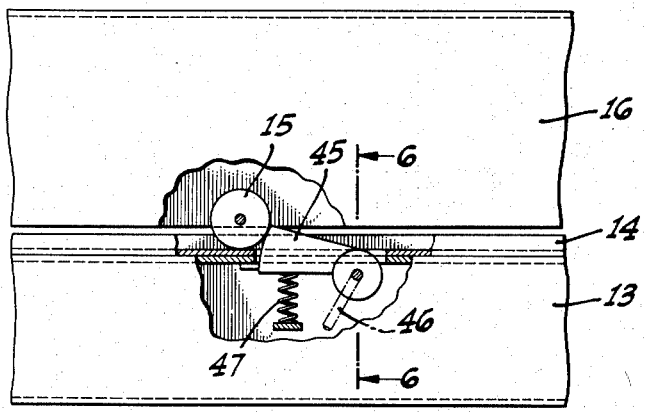
Fig. 5 is a partial view illustrating details of a stop or latch that may be used to limit rearward movement of the truck body with relation to the truck chassis to the position shown in Fig. 2 while the forward legs are being extended.
Figure 6:
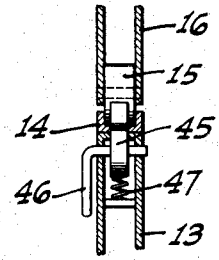
Fig. 6 is a vertical section taken substantially upon the line 6—6 upon Fig. 5.

The present invention contemplates a latch which will releasably lock the lower leg section in this position and prevent its movement relative to the upper leg section in the opposite direction until it is desired to collapse the gear. To this end the outer side of the U-shaped socket on each upper leg section is provided with an outwardly projecting boss or pin 29 and a latch 30 having a crotch 31 capable of receiving the pin 29 is pivoted as at 32 intermediate the ends of the lower leg section. Each latch 30 on the rear collapsible legs has a crank 33 pivoted thereto as at 34. The cranks 33 are rigid with a transversely extending crank shaft 35 and the crank shaft 35 is equipped with spaced cranks 36 between which there is pivoted a crosshead 37. A threaded link 38 is connected to the crosshead and has threaded engagement at 39 with a hand crank 40 that is rotatably mounted on the rear end of the truck such as by a thrust bearing 41. The forward pair of retractable gears, one of which is indicated generally at 42, are similarly constructed and are operable by cranks on a forward crank shaft carrying cranks 43 between which there is a crosshead 44. The crosshead 44 can be moved forwardly and rearwardly by a similar construction to that illustrated in Fig. 4 so that in the preferred arrangement at the back of the truck body there are two closely adjacent hand cranks 40 one of which is operable to forcibly swing the cranks 33 of the rear pair of legs and the other of which is operable to forcibly swing the cranks 33 of the forward pair of legs. In this manner the rear pair of legs and the forward pair of legs can be extended or retracted independently of each other.

Assuming that a retractable gear is in extended position, as shown in Fig. 7, and it is desired to collapse the gear, the crank 40 is rotated in a direction to force the crosshead 37 forwardly and thus swing the cranks 33 in a counterclockwise direction as viewed in Figs. 7, 8 and 9. As will be noted in Fig. 7, when the leg is in its fully extended position the pivot 34 is disposed beneath a straight line connecting the center of pivot 32 and the axis of crank shaft 35. As the crank 33 starts its movement in a counterclockwise direction the first movement is to swing the latch 30 in a clockwise direction, as shown in Fig. 8, thus causing the latch 30 to disengage or release the pin 29. When the pin 29 has been thus released the lower leg section 25 can pivot about the pivot 26 relatively to the upper leg section 20. As the crank 33 continues its counterclockwise movement, as viewed in Figs. 7, 8 and 9, it causes the latch 30 to pull upon the lower leg section 25 and to cause the lower leg section to swing relative to the upper leg section. Ultimately the crank 33 will assume a position as shown in Fig. 9 wherein the parts of the gear are collapsed together in snug relationship beneath the body of the truck. When it is desired to extend the rear pair of legs from their collapsed positions the crank 40 is rotated in the other direction to pull the crosshead 37 forwardly, swinging the cranks 33 in a clockwise direction. Downward movement of the cranks 33 enables the leg sections to swing progressively from the position shown in Fig. 9 through the position shown in Fig. 8 to the position shown in Fig. 7 wherein the lower leg section 25 has entered the socket formed by the angles 28 and has been automatically locked in this position by the final swinging of the latch 30 into engagement with the pin 29. In this position the lower leg section 25 is rigidly held against pivoting relatively to the upper leg section 20 in either direction and as the pivot 34 has swung over center between pivot 32 and the axis of crank shaft 35, the crank 33 together with the latch 30 in effect forms a brace or strut, locking the sections of the leg in the position shown in Fig. 7.

Figure 2:
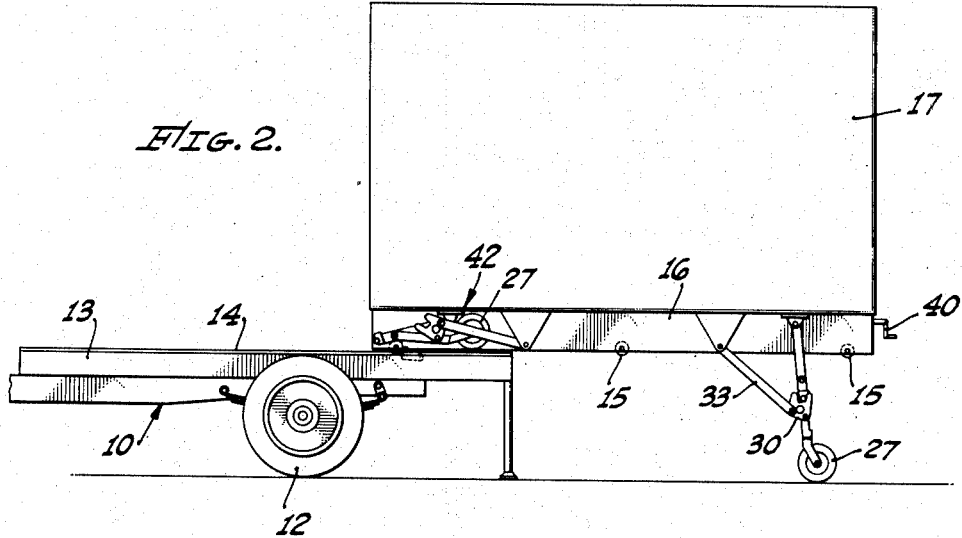
Fig. 2 is a partial view similar to Fig. 1 but illustrating the rear legs of the truck body as having been extended and the forward legs in a position wherein they can be extended to support the forward end of the truck body.
Figure 3:
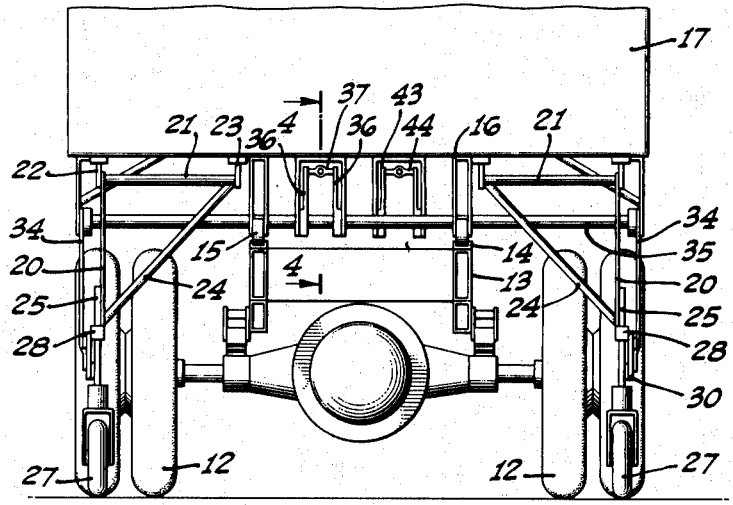
Fig. 3 is a view in rear elevation of the chassis and truck body, the rear legs being shown as having been extended as illustrated in Fig. 2.

Near the rear end of the rails 14 a latch or stop 45 is provided which is operable by a hand crank 46. This latch or stop is urged upwardly by a compression spring 47 to limit rearward movement of the truck body relative to the chassis to the position shown in Fig. 2 in the course of rolling the truck body from the truck chassis. As will be observed from Fig. 3, the caster wheels 27 are arranged with respect to the truck body 17 approximately in alignment with the wheels of the truck. Consequently it is necessary to partially roll the truck body 17 from the chassis before extending the legs of the forward pair. This is necessary in order that these legs when extended will assume positions behind the rear wheels 12. When the truck body has assumed the position shown in Fig. 2, the companion hand crank at the rear of the body may be rotated to extend the legs of the forward pair and when these have been completely extended the latch or stop 45 can be depressed against the action of the compression spring 47 and the body 17 completely passed off of the truck chassis. In the alternative the truck chassis can be driven from beneath the self-supported truck body.

The improved gear is of such a length as to support the bottom of the body 17 at loading dock height and in the event that it is inconvenient to load or unload the body 17 at a particular time the body 17 can be wheeled in any direction by means of the caster wheels 27. Under these circumstances the body may perform the function of a temporary portable warehouse for containing its freight until such time as it may be convenient to load or unload it. It will be appreciated that the body may be very easily and quickly positioned on the truck chassis or removed therefrom and when removed from the truck chassis it is supported on a very rigid collapsible leg structure that can be easily extended or collapsed and, when collapsed, it assumes a compact position beneath the truck body so that it is not necessary to mount the truck body on the frame in an unnecessarily high position.

Various changes may be made in the details of the construction without departing from the spirit and scope of the invention as defined by the appended claims.

I claim:

1. A retractable gear for removable truck bodies and the like comprising a jointed leg structure composed of an upper leg section hingedly mounted on the underside of a truck body, a lower leg section pivotally connected to the upper section intermediate its ends, means on the upper section for limiting swinging movement of the lower section relatively thereto in one direction, a latch pivotally mounted upon the lower section intermediate its ends engageable with the upper section to lock the upper and lower sections against pivotal movement in the other direction, a crank pivotally mounted upon the underside of the truck body and pivotally connected to the latch, and means for forcibly swinging said crank whereby when the crank is swung upwardly the latch may be caused to release the upper section and both sections may be collapsed against the underside of the truck body.

2. A retractable gear for removable truck bodies and the like comprising a jointed leg structure composed of an upper leg section hingedly mounted on the underside of a truck body, a lower leg section pivotally connected to the upper section intermediate its ends, means on the upper section for limiting swinging movement of the lower section relatively thereto in one direction, a latch pivotally mounted upon the lower section intermediate its ends engageable with the upper section to lock the upper and lower sections against pivotal movement in the other direction, a crank pivotally mounted upon the underside of the truck body and pivotally connected to the latch, and means for forcibly swinging said crank whereby when the crank is swung upwardly the latch may be caused to release the upper section and both sections may be collapsed against the underside of the truck body, the pivotal connection between the crank and the latch being so arranged that when the latch is engaging the upper section to lock the sections against relative movement the pivotal connection between the crank and latch will have crossed a center line joining the pivot between the latch and the lower section and the axis of rotation of the crank.

3. A retractable gear for removable truck bodies and the like comprising an upper leg section adapted to be swingably mounted upon each corner of the underside of a truck body, a lower leg section pivotally connected thereto, means limiting swinging movement of the lower section relative to the upper section in one direction, a latch pivotally mounted upon the lower leg section engageable with the upper leg section to lock the lower leg section against swinging movement relative to the upper leg section in the other direction, a crank shaft adapted to be mounted on the underside of the truck body, one crank on said crank shaft pivotally connected to each latch, a second crank on said crank shaft for actuating said one crank, a crosshead pivotally mounted upon the second crank, a threaded member connected to the crosshead, and a crank threadedly engaging the threaded member and rotatably mounted on the truck body adjacent the rear end thereof for actuating said second crank.

4. A retractable gear for removable truck bodies and the like comprising a truck body removably mounted upon a wheeled truck chassis, rails on said truck chassis, rail contacting rollers depending from said truck body, retractable and expandable jointed leg structure hingedly secured to the underside of said truck body within the lateral limits thereof for supporting said truck body when the latter is removed from said truck chassis, said leg structure being within the lateral limits of said wheels on said truck chassis, and means for expanding and retracting the leg structure, said leg structure in the retracted condition being between the underside of said truck body and the lower periphery of the rollers.

5. A retractable gear for removable truck bodies and the like comprising a truck body removably mounted upon a truck chassis the latter having wheels thereon, rails on said truck chassis, rail contacting rollers depending from said truck body, retractable and expandable jointed leg structure hingedly secured to the underside of said truck body between the lateral limits of the wheels on the truck chassis and truck body and the rails on the truck chassis, said leg structure having ground engaging members thereon for supporting said truck body when the latter is at least partially removed from said truck chassis, and means for expanding and retracting the leg structure, said leg structure in the retracted condition being between the underside of said truck body and lower periphery of the rollers.

GEORGE V. HELMS.

References Cited in the file of this patent

UNITED STATES PATENTS

| Number | Name | Date |
|---|---|---|
| 1,049,210 | Cole, Jr. | Dec. 31, 1912 |
| 1,303,854 | Clark | May 20, 1919 |
| 1,615,532 | Baxter | Jan. 25, 1927 |
| 1,952,015 | Kranzhoff | Mar. 20, 1935 |
| 2,280,185 | Bridges | Apr. 21, 1942 |
| 2,412,158 | Kuehlman et al. | Dec. 3, 1946 |

FOREIGN PATENTS

| Number | Country | Date |
|---|---|---|
| 518,073 | Great Britain | Feb. 16, 1940 |